G. Hutton,
Hanging Saws,
N°15,130. Patented June 17, 1856.
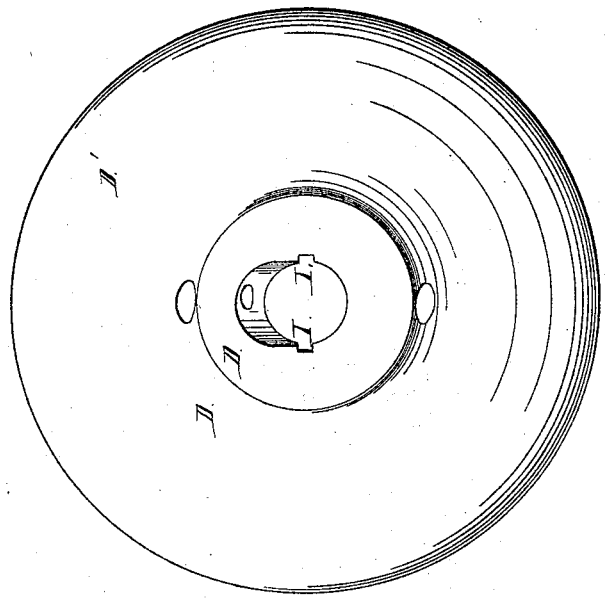
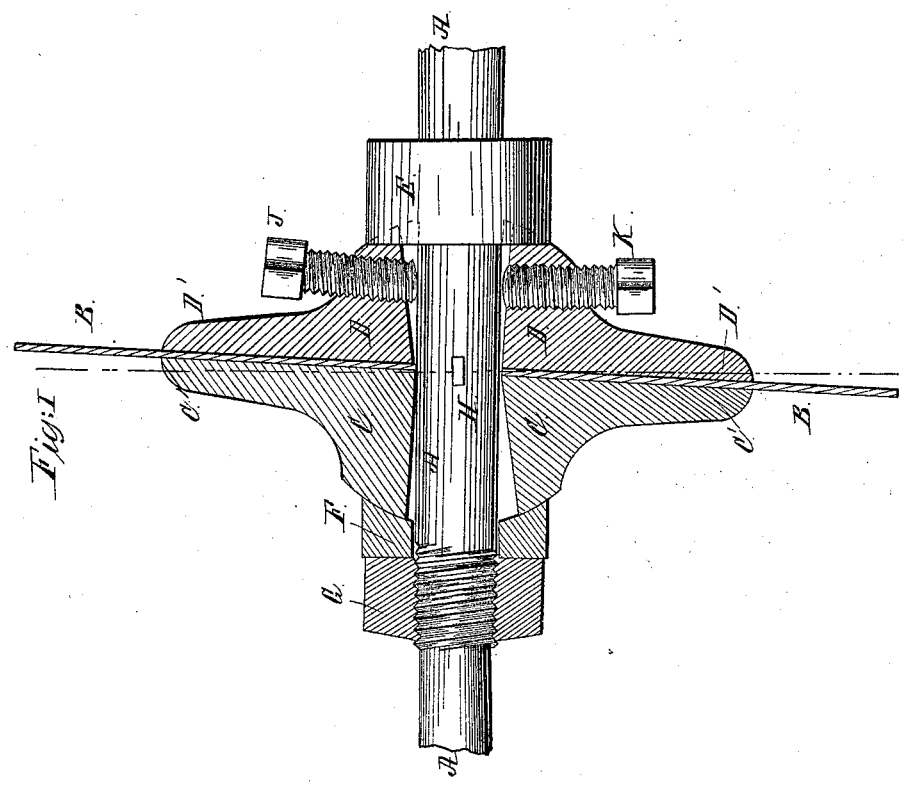

UNITED STATES PATENT OFFICE.

GEORGE HUTTON, OF NEW YORK, N. Y.

MECHANISM FOR ADJUSTING CIRCULAR SAWS OBLIQUELY TO THEIR ARBORS.

Specification of Letters Patent No. 15,130, dated June 17, 1856.

*To all whom it may concern:*

Be it known that I, GEORGE HUTTON, of the city and county of New York and State of New York, have invented a new and Improved Method of Adjusting Circular Saws Obliquely or Square upon Their Shafts; and I do hereby declare that the following is a full and exact description thereof, reference being had to the accompanying drawings and to the letters marked thereon.

Figure 1 is a longitudinal section along the shaft, and Fig. 2 an end view of the clamp or collar D.

Among the uses of which an ordinary circular saw is susceptible is that of grooving the edge of lumber. A saw of any ordinary thickness may groove a channel considerably wider than itself if such saw be secured obliquely on the shaft. This method of grooving is well known, the same saw being used to cut grooves of various widths by varying the obliquity of the saw on its axis.

My invention consists in an improved method of adjusting by means of which the saw may readily be set either square across the shaft or inclined to any proper degree. When the saw is fixed square on the shaft, it cuts a thin "kerf" like an ordinary circular saw, but when inclined it cuts a wider channel or groove the width of which varies according to the amount of inclination.

My invention allows the saw to stand at any inclination desired within certain limits, so to be at once adjusted with certainty, square with the shaft, but both these advantages have been secured, by other methods of adjustment, so that the novelty of my invention consists not in the end attained but in the means employed for the purpose.

To enable others skilled in the art to make and use my invention I will proceed to describe its construction and operation by the aid of the drawings accompanying and forming part of this specification.

The shaft or spindle is denoted by A and the saw by B. A red line is drawn precisely at right angles to the shaft, A in order the better to show the amount of inclination which I have chanced to give the saw, in the drawing.

C and D are large collars of metal which press against the flat sides of the saw and sustain it. Each collar is perfectly flat on the face touching the saw and perfectly spherical on its other face. These collars may when desired be removed from the spindle. There is immovably fixed on the shaft an additional collar E, one face of which is concave so as to fit perfectly to the corresponding spherical or convex face of D. A washer F similarly concave is slipped loosely on the shaft A so as to fit in the same manner against the convex face of the collar C. A nut G screwed on A presses against the plane face of F and by the aid of this nut all the parts may be released or firmly secured at pleasure. The movable collars C and D must have considerable thickness so that the convex faces thereof will be portions of large and not of small spheres, and also that the center of such sphere must coincide with the center of the saw. The shaft A is of such size as very nearly to fill the circular surface on the plane faces and also to fill the orifices in one direction on the convex faces but in the other direction the oblong shape of the last named orifices allows considerable play. The drawings convey to the skilful mechanic a clear idea of the form of these holes at each face and at all the intermediate points. When the collars C and D are placed together in their proper positions relatively each to the other, the nut G being slackened to allow motion of the parts, the saw may be seized by the hand and readily placed square with the spindle or as readily inclined over in one direction, but it cannot by any force be inclined in any other direction by reason of the peculiar form of the cavities described. This device allows also of adjusting the obliquity of the saw, by percussion, which is on some accounts a superior agency for this purpose.

In order to adjust a saw when arranged according to my invention so far as now described it is necessary to slacken the nut G but yet allow it to press so as to confine the parts with moderate force and strike with a mallet or the like against the projecting rim C' or D' of the movable collars C and D. By this means the amount of obliquity desired may be obtained with accuracy after which the nut G must be screwed very tightly to its place. When thus screwed up the pressure against the parts is sufficient to prevent any change until the nut is again slackened.

When it is desired to set the saw square with the shaft it is only necessary to drive its edge in one direction until it can go no farther, by reason of the side of the hole bearing fair along, the shaft. It is well to mark in some way that point in the rim of C and D to which pressure or percussion should be applied in order to be most effective.

In order to compel the movable collars C and D to maintain a proper position relatively each to the other I make a projection H on the shaft and cut corresponding notches or grooves in both the movable collars and also in the saw. Two such projections may be employed if preferred as indicated by the two seats or grooves to receive them at I, I, in Fig. 2. These do not interfere with the removal, nor with the adjustment of the parts and only serve by preventing either from turning on the shaft to insure the proper position of C and D and of the holes in the same relatively to each other.

To facilitate a nice adjustment of the parts without employing percussion I provide screws J and K tapped through D and pressing with their smooth rounded ends upon the shaft A. When desiring to adjust the saw by these means I slacken the nut G and unscrew one of these last named screws and screw in the other until the motion thus produced brings the saw to the plane desired after which I again tighten the nut G as before. When adjusting the saw by percussion as first described both the screws J and K must first be slackened.

Having now fully described my device what I claim as my invention and desire to secure by Letters Patent, is—

1. The combination of the two spherical faced and peculiarly perforated movable collars C and D with the concave fixed collar E and the concave washer F substantially as described and for the purposes set forth.

2. I also claim the employment of the adjusting screws J and K in combination with the above described collars C and D the concave fixed collar E and the concave washer F as set forth.

G. HUTTON.

In presence of—
 JNO. WARD, Jr.,
 THOMAS D. STETSON.